(12) United States Patent
Cunningham et al.

(10) Patent No.: US 12,000,358 B1
(45) Date of Patent: Jun. 4, 2024

(54) GAS TURBINE ENGINE NOZZLE LOFT FOR THRUST REVERSER

(71) Applicant: Pratt & Whitney Canada Corp., Longueuil (CA)

(72) Inventors: Mark Cunningham, Montreal-Ouest (CA); Eray Akcayoz, Cote-Saint-Luc (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/109,428

(22) Filed: Feb. 14, 2023

(51) Int. Cl.
*F02K 1/62* (2006.01)
*F02K 1/58* (2006.01)

(52) U.S. Cl.
CPC .............. *F02K 1/62* (2013.01); *F02K 1/58* (2013.01); *F05D 2220/323* (2013.01)

(58) Field of Classification Search
CPC ... F02K 1/60; F02K 1/605; F02K 1/62; F02K 1/625; F02K 1/58
See application file for complete search history.

(56) References Cited

U.S. PATENT DOCUMENTS

| | | | |
|---|---|---|---|
| 5,058,379 A * | 10/1991 | Lardellier | F02K 3/077 60/268 |
| 8,091,335 B2 | 1/2012 | Sternberger | |
| 8,439,305 B2 | 5/2013 | Marley | |
| 9,057,286 B2 | 6/2015 | Murphy et al. | |
| 9,777,598 B2 * | 10/2017 | Joret | F01D 25/24 |
| 10,018,152 B2 | 7/2018 | Pascal et al. | |
| 2014/0239084 A1 * | 8/2014 | Chandler | F02K 1/763 239/11 |
| 2019/0293023 A1 * | 9/2019 | Guerinot | F02K 1/605 |
| 2020/0040844 A1 * | 2/2020 | Gormley | F02K 1/60 |

FOREIGN PATENT DOCUMENTS

| | | | | |
|---|---|---|---|---|
| DE | 102016100575 A1 * | 7/2017 | | F02K 1/60 |
| EP | 2534360 B1 | 12/2012 | | |

* cited by examiner

*Primary Examiner* — Andrew H Nguyen
(74) *Attorney, Agent, or Firm* — Carlson, Gaskey & Olds, P.C.

(57) ABSTRACT

An engine nacelle assembly includes a nacelle that defines a flow path between an intake end and an exhaust end, and a nozzle that is disposed at the exhaust end of the nacelle about a central axis. The nozzle includes opposing thrust reverser openings and thrust reverser doors. A cross-sectional area transverse to the central axis proximate a forward side of each of the opposing thrust reverser openings is oval shaped with an offset radius within offset arc segments that are aligned with the opposing thrust reverser openings and a first radius outside of the offset arc segment. The first radius is less than the offset radius.

20 Claims, 5 Drawing Sheets

GAS TURBINE ENGINE NOZZLE LOFT FOR THRUST REVERSER

BACKGROUND

A turbine engine is typically mounted within a nacelle structure that supports a core engine and may also define a bypass flow path. Exhaust gases and any bypass flows are directed through the nacelle structure and exhausted through a nozzle. The nozzle defines a flow area for exhausting the flows to generate a forward propulsive thrust. Nozzles may include a thrust reverser to enhance stopping power of an aircraft during landing. The thrust reverser includes doors that open and direct propulsive thrust forward toward a nose of the aircraft. In a deployed position, the nozzle gas path is defined through an opening defined by the open doors.

Turbine engine manufacturers continue to seek improvements to engine performance including improvements to thermal, transfer, weight and propulsive efficiencies.

SUMMARY

An engine nacelle assembly according to an exemplary embodiment of this disclosure, among other possible things includes a nacelle that defines a flow path between an intake end and an exhaust end, and a nozzle that is disposed at the exhaust end of the nacelle about a central axis. The nozzle includes opposing thrust reverser openings and thrust reverser doors. A cross-sectional area transverse to the central axis proximate a forward side of each of the opposing thrust reverser openings is oval shaped with an offset radius within offset arc segments that are aligned with the opposing thrust reverser openings and a first radius outside of the offset arc segment. The first radius is less than the offset radius.

A thrust reverser for a turbine engine according to another exemplary embodiment of this disclosure, among other possible things includes a nozzle that includes an inlet and exit spaced axially apart along a central axis, opposing thrust reverser openings and first and second side arms are disposed on either side of each of the opposing thrust reverser openings, and thrust reverser doors that are movable between a closed position that covers a corresponding one of the opposing thrust reverser openings and an open position uncovering the opposing thrust reverser openings. A cross-sectional area transverse to the central axis proximate a forward side of each of the opposing thrust reverser openings is oval shaped with an offset radius within offset arc segments that are aligned with the opposing thrust reverser openings and a first radius outside of the offset arc segment. The first radius is less than the offset radius.

A turbine engine assembly according to another exemplary embodiment of this disclosure, among other possible things includes a core engine, a nacelle that surrounds at least a portion of the core engine that defines a flow path between an intake end and an exhaust end, and a nozzle that is disposed at the exhaust end of the nacelle. The nozzle includes an inlet and exit spaced apart axially along a central axis, opposing thrust reverser openings, and thrust reverser doors that are movable between a closed position that covers a corresponding one of the opposing thrust reverser openings and an open position that uncovers the opposing thrust reverser openings. A cross-sectional area that is transverse to the central axis proximate a forward side of each of the opposing thrust reverser openings is oval shaped with an offset radius within offset arc segments that are aligned with the opposing thrust reverser openings and a first radius outside of the offset arc segment. The first radius is less than the offset radius.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
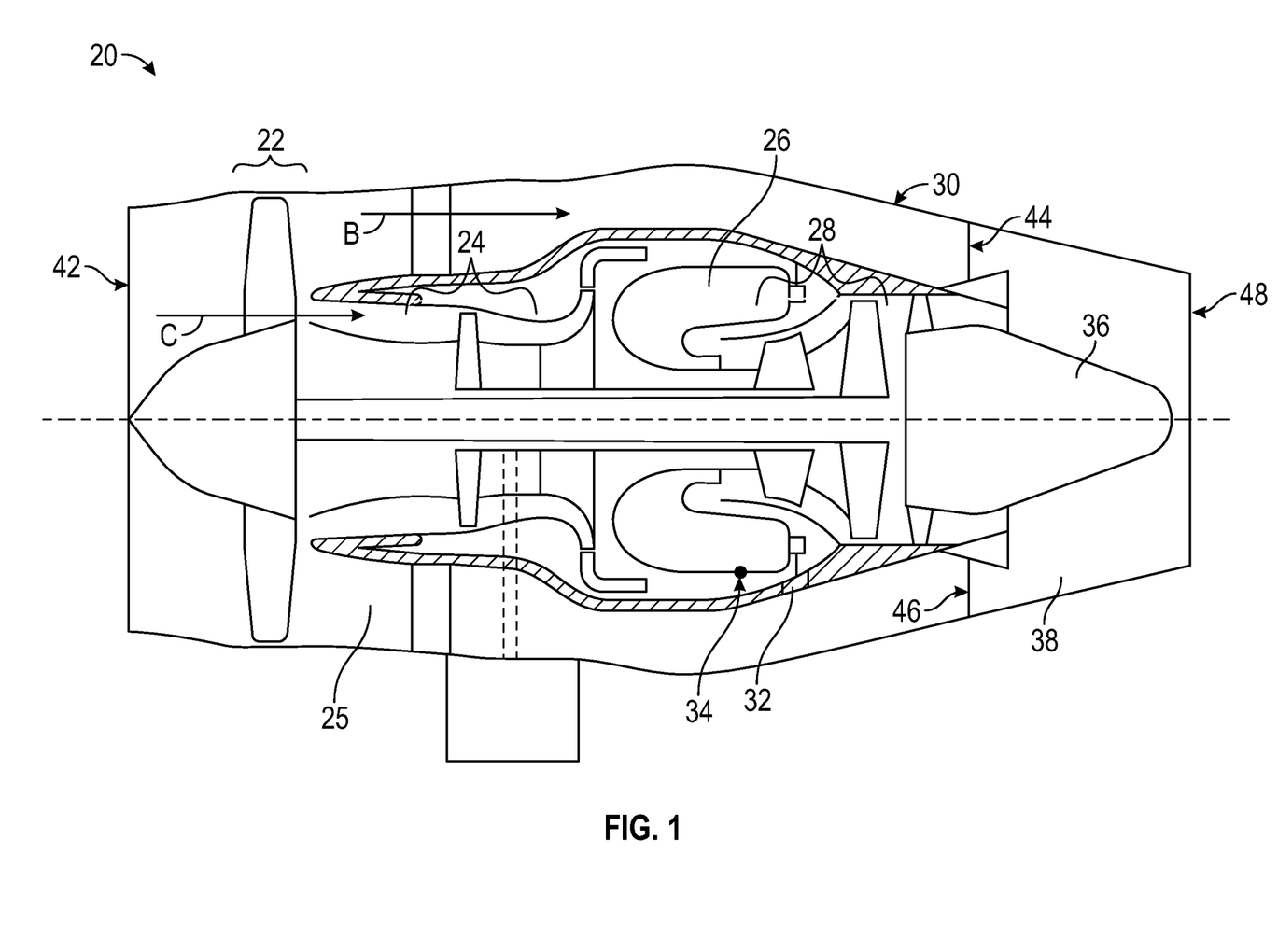
FIG. 1 is a schematic view of an example turbine engine and nozzle embodiment.

FIG. 1 schematically illustrates a gas turbine engine 20. The example gas turbine engine 20 is a turbofan that generally incorporates as a core engine 25, a fan section 22, a compressor section 24, a combustor section 26 and a turbine section 28. The fan section 22 drives air along a bypass flow path B in a bypass duct defined within a nacelle 30. The compressor section 24 drives air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted past tail cone 36.

Although depicted as a turbofan turbine engine in the disclosed non-limiting embodiment, it should be understood that the concepts described herein are not limited to use with turbofans as the teachings may be applied to other types of turbine engines. Moreover, although turbine engines are described by way of example, other engine configurations such as internal combustion engines could be utilized and are within the contemplation of this disclosure.

The nacelle 30 includes an intake end 42 and an exhaust end 44. A thrust reversing nozzle 38 is disposed at the exhaust end 44. The nozzle 38 defines an exhaust flow path between an inlet 44 and an exit 48. The nozzle 38 is attached to the exhaust end 44 of the nacelle 30.

Figure 2:
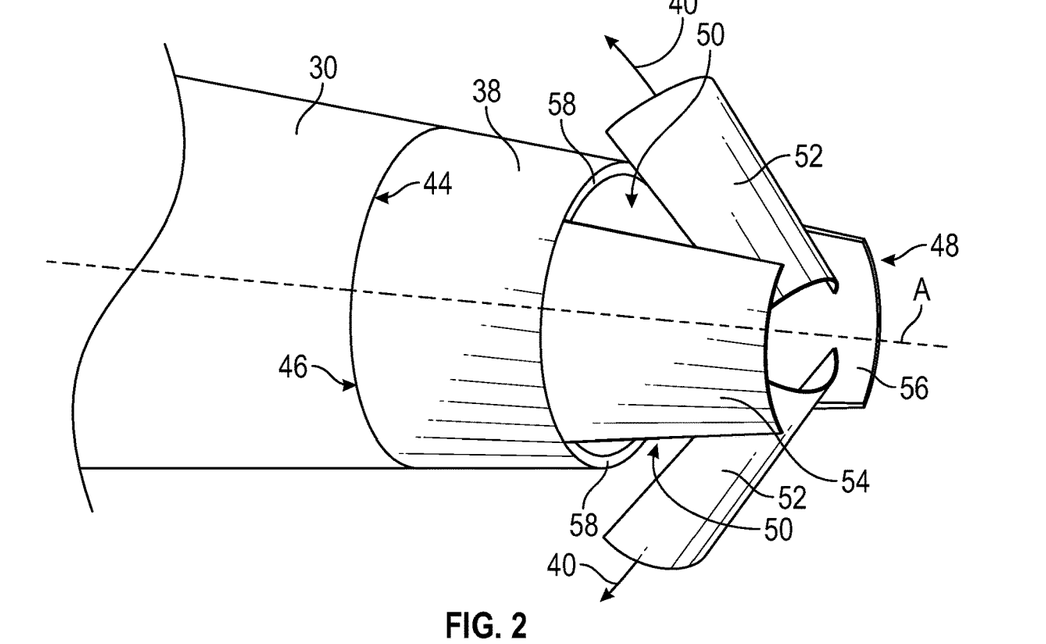
FIG. 2 is a perspective view of an example thrust reverser nozzle embodiment.

Referring to FIG. 2, with continued reference to FIG. 1, nozzle 38 includes opposing thrust reverser openings 50 that are covered by thrust reverser doors 52 when in a closed position. In an open or deployed position, the thrust reverser doors 52 uncover the thrust reverser openings 50 to direct flow 40 through the nozzle 38 forward towards a nose of the aircraft to provide faster deceleration. In the deployed position shown in FIG. 2, the opposing thrust reversing openings 50 and the inner surface of the thrust reversing doors 52 form the path for the flow 40. Although the example openings 50 and doors 52 are substantially the same, the openings 50 and doors 52 may be sized differently to provide different flow areas and remain with the contemplation and scope of this disclosure.

The area of the openings 50 are defined between first and second arms 54, 56, the inner side of the thrust reverser doors 52 and by a cross-section through the nozzle 38 proximate a forward side 58 of each of the openings 50. The inner cross-sectional area of the nozzle 38 at the forward side 58 of each of the openings 50 further defines the flow area for the flow 40 when the thrust reverser doors 52 are deployed. The nozzle geometry is balanced to provide sufficient area to match other engine operating conditions during forward aircraft operation and thrust reverser performance.

The example nozzle 38 includes an increased cross-sectional area at an axial position corresponding with the forward side 58 of each of the openings 50 to increase an effective area with the doors 52 deployed. The forward and exit areas remain unchanged. In one example embodiment, the forward and exit areas are substantially circular. The localized increase in the cross-sectional area at the openings 50 provides an increase in the effective flow area, without adjusting or changing other features of the nozzle 38, thereby maintaining desired performance during other engine operating conditions.

Figure 3:
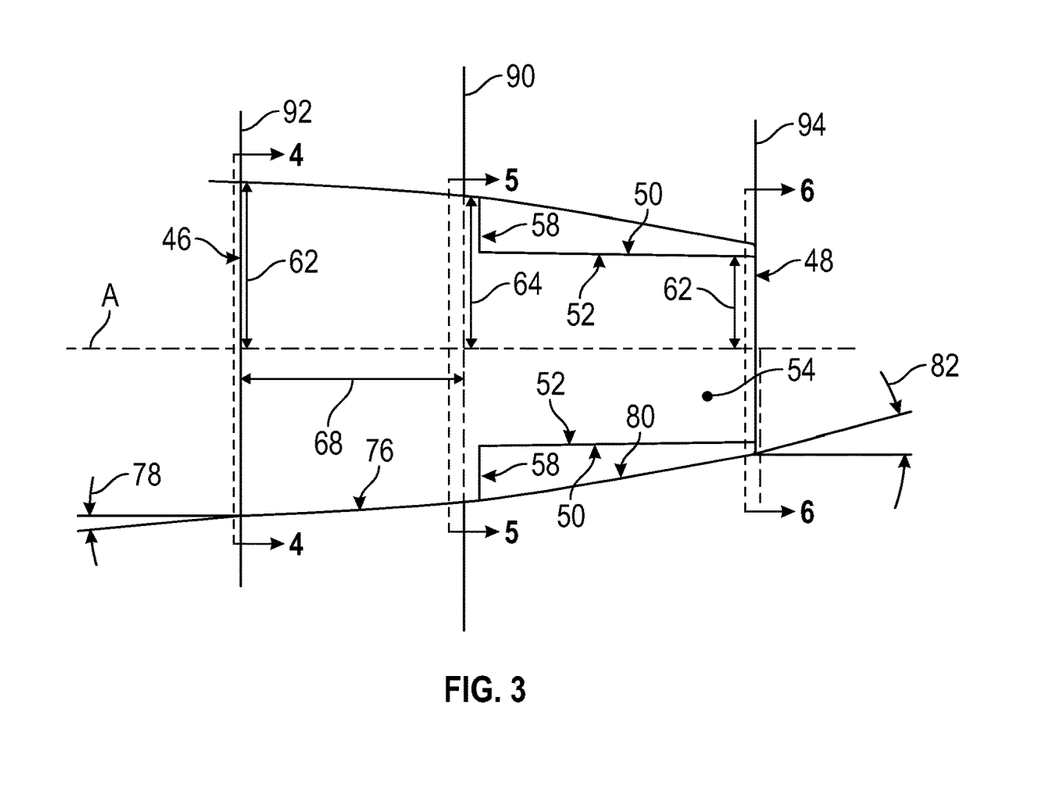
FIG. 3 is a schematic cross-section of the example thrust reverser nozzle.

Referring to FIG. 3 with continued reference to FIG. 2, the example inlet 46 and exit 48 are circular while the cross-section proximate the forward side 58 is offset to provide a local oval shape. Accordingly, in one disclosed example, an inner radius at each of the inlet 46 and the exit 48 is uniform about the central axis A to provide a circular cross-sectional area. An offset radius at the forward side 58 of each of the opposing openings 50 is increased at top and bottom circumferential positions to provide an oval cross-sectional flow area at an axial distance 68 from the inlet 46.

Although the cross-section of the inlet 46 and exit 48 are shown by way of example as being circular with a uniform radius, other shapes could be utilized including elliptical, oval and other irregular shapes and remain with the contemplation and scope of this disclosure. Moreover, although the example nozzle 38 is shown as being symmetric about the axis A, the entire nozzle 38 or portions of the nozzle 38 may be asymmetric about the axis A and remain within the scope and contemplation of this disclosure.

Figure 4:
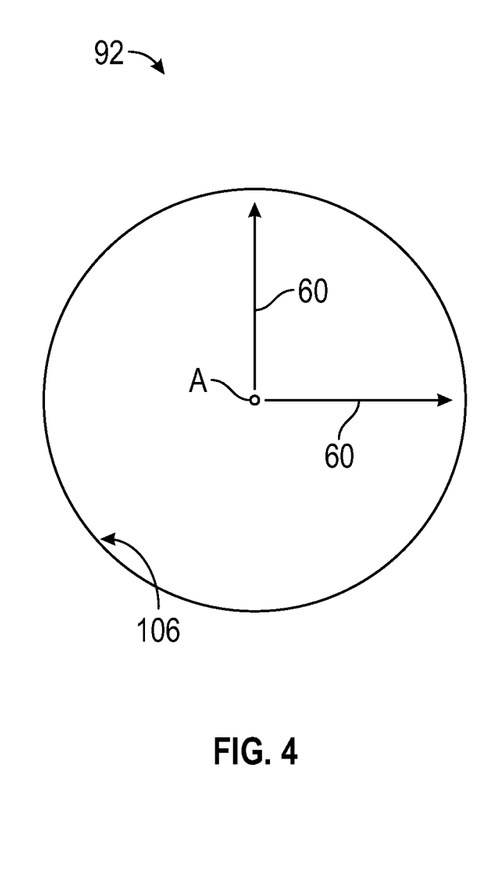
FIG. 4 is a sectional view at a forward inlet of the thrust reverser nozzle.
Figure 6:
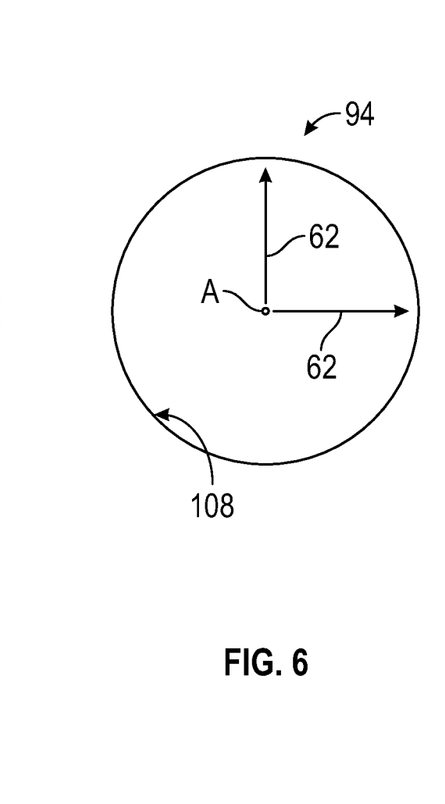
FIG. 6 is a sectional view at an exit of the thrust reverser nozzle.

Referring to FIGS. 4, 5 and 6 with continued reference to FIG. 3, an inner peripheral surface 106 of the nozzle 38 within a plane 92 at the inlet 46 is of a constant radius 60 about the axis A to define a circular flow area (FIG. 4). The inner peripheral surface 108 of the nozzle 38 within the plane 94 at the exit 48 includes a constant radius 62 about the axis A to define a circular flow area (FIG. 6).

Figure 5:
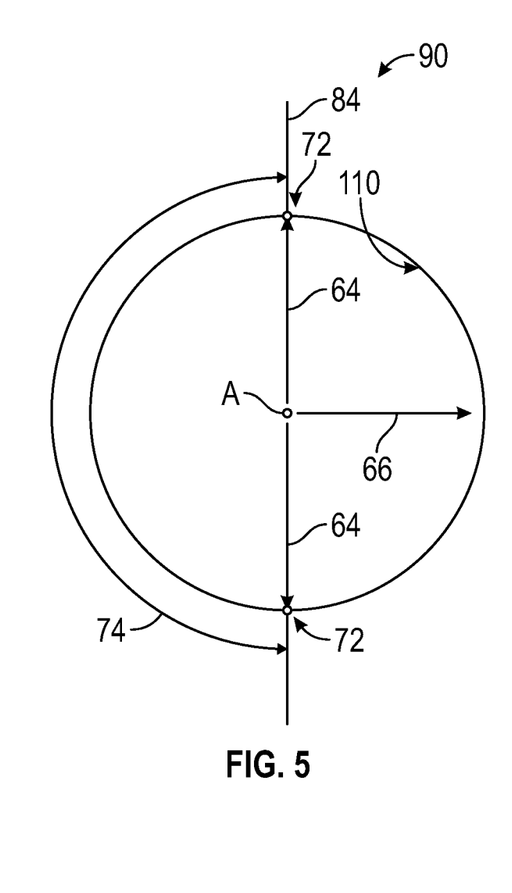
FIG. 5 is a sectional view at a forward side of a thrust reverser opening.

An inner peripheral surface 110 within a plane 90 proximate the forward side 58 of each of the opposing openings 50 includes an offset radius 64 that is larger than a first radius 66 to define an oval-shaped flow area (FIG. 5). The example offset radius 64 tapers from the radius 66 to a maximum offset radius located along a central plane 84 (FIG. 5) transverse to the central axis A. The maximum radii are spaced apart a circumferentially as indicated at 74. In this example embodiment, the maximum offset radius is located at positions indicated at 72 that are spaced circumferentially apart 180 degrees. Moreover, the axial location of the maximum offset radius 64 is shown as being proximate the forward side 58 of the openings 50 within the plane 90. The plane 90 is spaced the axial distance 68 from the inlet 46.

In this example embodiment, the maximum offset radius positions 72 are disposed at the top center and bottom center positions. However, the maximum offset radius position may be tilted with respect to the central plane 84 and remain within the contemplation and scope of this disclosure.

The increase in radius proximate the forward side 58 is provided by a first tapered inner surface 76 between the inlet 46 and the plane 90 proximate the forward side 58. The tapered inner surface 76 is disposed at a first angle 78 (FIG. 3). A second tapered inner surface 80 extends from the plane 90 proximate the forward side 58 to the exit 48. The second tapered inner surface 80 is disposed at a second angle 82 (FIG. 3). The second angle 82 is greater than the first angle 76 to provide for the transition from the elliptical cross-section to the circular cross-section at the exit 48.

Figure 7:
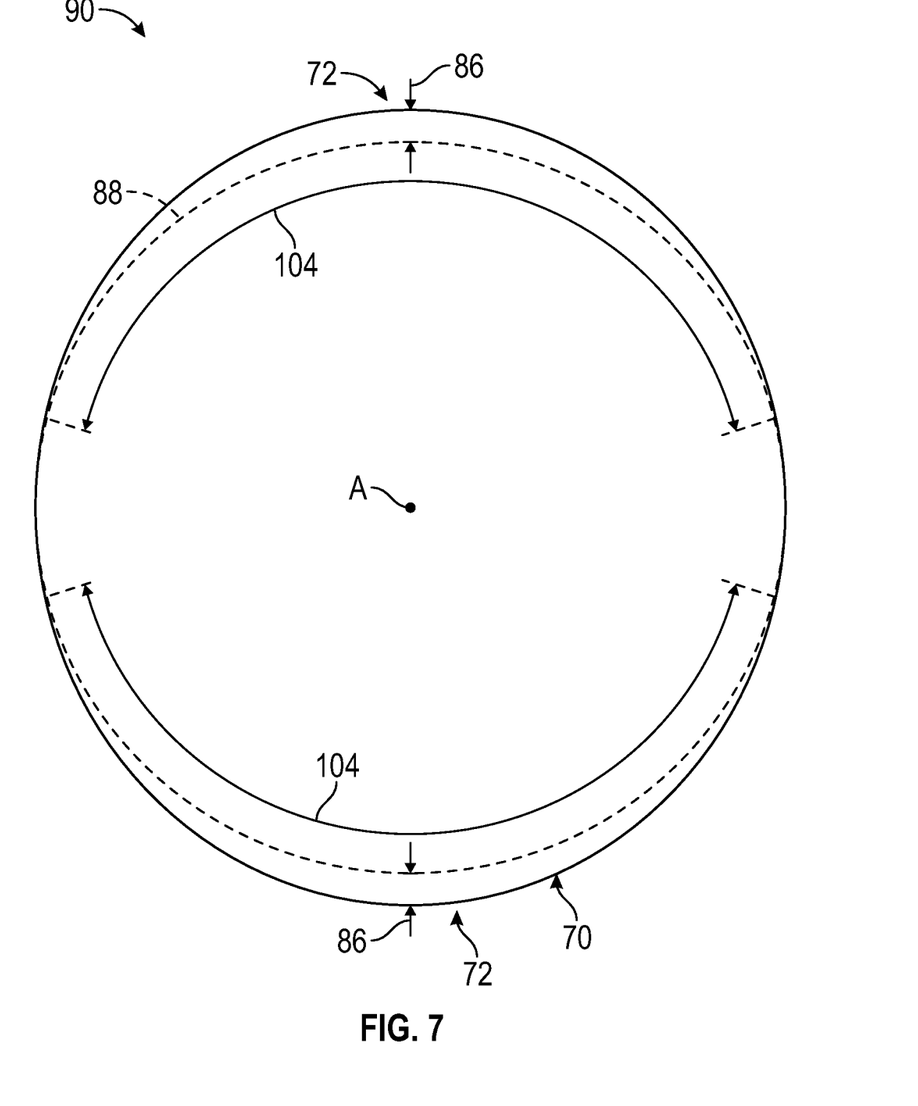
FIG. 7 is another sectional view at the forward side of the thrust reverser opening.

Referring to FIG. 7, with continued reference to FIGS. 3 and 5, an offset 86 is shown as compared to a circular area shown by the dashed line circle indicated at 88. The offset 86 provides for an increased area within the solid outline 70 representing the inner surface of the nozzle 38 as compared to a circular area indicated by the dashed line 88. The offset 86 is disposed within offset arc segments 104 at top and bottom portions of the inner surface. The offset 86 increases in a direction toward the top and bottom maximum offset positions 72 of the inner surface.

In one example disclosed embodiment, the cross-sectional area of the plane 90 within the nozzle at the axial distance 68 corresponding with the forward side 58 is between 1% and 10% greater than a cross-sectional area at the same axial location with a uniform radius about the central axis as represented by the dashed line circle 88. In another disclosed embodiment, the cross-sectional area is between 2% and 3% greater than cross-sectional area at the same axial location with a uniform radius about the central axis as represented by the dashed line circle 88.

In one example embodiment, the maximum increased offset radius 64 is between 1% and 10% greater than the first inner radius 66 outside of the thrust reverser openings 50 at a common axial location defined along the central plane 84. In another example embodiment, the maximum offset radius 64 is between 2% and 3% greater than the inner radius 66 outside of the thrust reverser openings 50 at the common axial location defined along the central plane 84.

Figure 8:
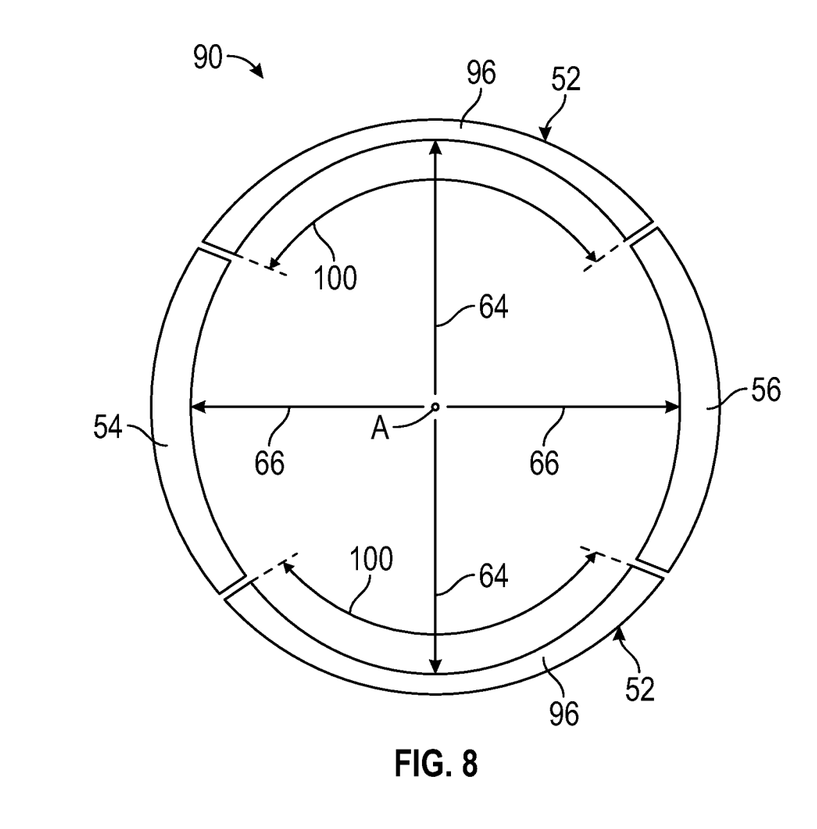
FIG. 8 is a sectional view at the forward side of the thrust reverser opening.
Figure 9:
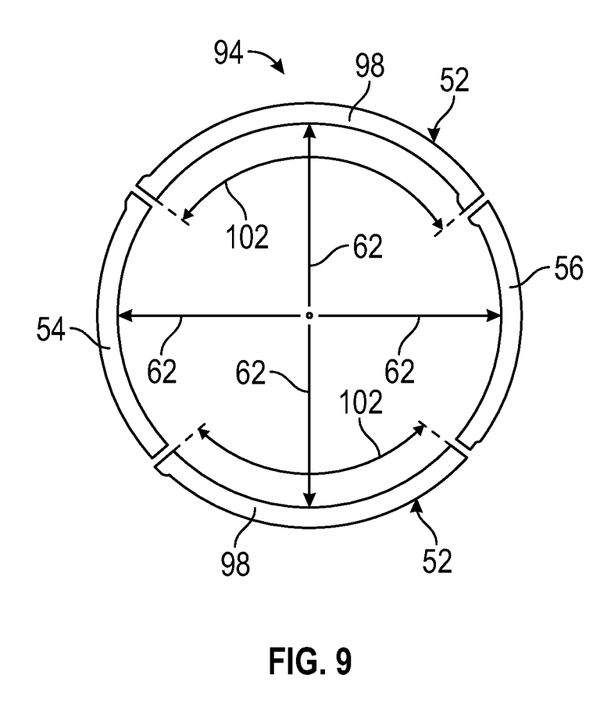
FIG. 9 is another sectional view at the exit of the thrust reverser nozzle.

Referring to FIGS. 8 and 9, the thrust reverser doors 52 and the first and second side arms 54, 56 define the inner surface of the nozzle 38 from the plane 90 to the exit 48. The inner surface of the thrust reverser doors 52 are therefore spaced from the axis A the same offset radius 64 as is provided at the forward side 58. The radius 66 is clocked 90 degrees from the offset radius 64 and is defined by the inner surface of the first and second arms 54, 56.

Each of the thrust reverser doors include a forward edge 96 and an aft edge 98. In the closed position the forward edge 98 includes the offset inner radius 64 within the plane 90. The aft edge 98 of the thrust reverser doors 52 defines a portion of the uniform inner radius 62 about the central axis A within the plane 94 at the exit 48. In the closed position, the thrust reverser doors 52 define an arc 100 of the inner peripheral surface of the nozzle 38 at the forward edge 96 and an arc 102 at the aft edge 98. The arc 100 tapers from the forward edge 96 near the forward side 58 to the arc 102 within the plane 94 at the exit 48.

Although the aft edge of the reverser doors 52 define a portion of the exit 48 in one disclosed example, the exit 48 may be defined separate from the reverser doors 52. The exit 48 may be deposed axially aft of the aft edge 98 and include an uninterrupted periphery that is defined by static structures of the nozzle 38.

The radii defined by each of the thrust reverser doors 52 tapers from the offset radius 64 that is proximate the forward side 58 to the inner peripheral surface within the plane 94 at the exit 48. The radius 66 is clocked 90 degrees from the offset radius 64 defined by the first and second arms 54, 56 and tapers from the inner radius 66 within the plane 90 to the inner radius 62 disposed within the plane 94 at the exit 48. The constant uniform radius 62 about the axis A provides the circular cross-section at the exit 48. Although the thrust reverser doors 52 and the first and second side arms 54, 56 begin at different radii within the plane 90, they both taper to the common inner radius 62 to provide the circular area within the plane 94 at the nozzle exit 48.

Accordingly, the example nozzle 38 provides an increased thrust reverser flow area within a limited nozzle length without substantial changes to nozzle performance at other engine operating conditions.

An engine nacelle assembly according to an exemplary embodiment of this disclosure, among other possible things includes a nacelle 30 that defines a flow path between an intake end 42 and an exhaust end 44, and a nozzle 38 that is disposed at the exhaust end 44 of the nacelle 30 about a central axis. The nozzle 38 includes opposing thrust reverser openings 50 and thrust reverser doors 52. A cross-sectional area transverse to the central axis proximate a forward side 58 of each of the opposing thrust reverser openings 50 is oval shaped with an offset radius 64 within offset arc segments 104 that are aligned with the opposing thrust reverser openings 50 and a first radius 66 outside of the offset arc segment 104. The first radius 66 is less than the offset radius 64.

In a further embodiment of the foregoing engine nacelle assembly, the offset radius 64 at the forward side 58 of each of the opposing thrust reverser openings 50 includes a maximum offset that is disposed within a common plane transverse to the central axis.

In a further embodiment of any of the foregoing engine nacelle assemblies, the cross-sectional area that is proximate transverse to the central axis that is proximate the forward side 58 is between 1% and 10% greater than a cross-sectional area at the same axial location with a uniform radius about the central axis.

In a further embodiment of any of the foregoing engine nacelle assemblies, the maximum offset is between 2% and 3% greater than the first radius 66.

In a further embodiment of any of the foregoing engine nacelle assemblies, the nozzle 38 includes an inlet 46 that is spaced axially apart from an exit 48 along the central axis and the forward side 58 is spaced a first axial distance from the inlet 46 and an inner surface of the nozzle 38 tapers at a first angle 78 from the inlet 46 to the forward side 58 and tapers at a second angle 82 from the forward side 58 to the exit 48.

In a further embodiment of any of the foregoing engine nacelle assemblies, the first angle 78 is less than the second angle 82.

In a further embodiment of any of the foregoing, the engine nacelle assembly includes first and second arms 54, 56 that are disposed between the opposing thrust reverser openings 50 and extend from an axial location that is common with the forward side 58 to the exit 48. The first and second arms 54, 56 define a portion of an inner periphery 108 at the exit 48.

In a further embodiment of any of the foregoing engine nacelle assemblies, the inner periphery 108 at the exit 48 is uninterrupted.

In a further embodiment of any of the foregoing engine nacelle assemblies, the thrust reverser doors 52 each include a forward edge 96 and an aft edge 98 and in a closed position the forward edge 96 includes an offset inner radius that is equal to the offset inner radius 64 of the forward side 58 of a corresponding one of the thrust reverser openings 50.

In a further embodiment of any of the foregoing engine nacelle assemblies, the aft edge 98 of the thrust reverser doors 52 defines a portion of the inner periphery 108 at the exit 48.

In a further embodiment of any of the foregoing engine nacelle assemblies, in a closed position, the thrust reverser doors 52 define an arc 100/102 of the inner surface of the nozzle 38 that tapers from the forward side 58 toward the exit 48.

A thrust reverser for a turbine engine according to another exemplary embodiment of this disclosure, among other possible things includes a nozzle 38 that includes an inlet 46 and exit 48 spaced axially apart along a central axis, opposing thrust reverser openings 50 and first and second side arms 54, 56 are disposed on either side of each of the opposing thrust reverser openings 50, and thrust reverser doors 52 that are movable between a closed position that covers a corresponding one of the opposing thrust reverser openings 50 and an open position uncovering the opposing thrust reverser openings 50. A cross-sectional area transverse to the central axis proximate a forward side 58 of each of the opposing thrust reverser openings 50 is oval shaped with an offset radius 64 within offset arc segments 104 that are aligned with the opposing thrust reverser openings 50 and a first radius 66 outside of the offset arc segment 104. The first radius 66 is less than the offset radius 64.

In a further embodiment of the foregoing thrust reverser for a turbine engine, the offset radius 64 at the forward side 58 of the opposing thrust reverser openings 50 includes a maximum offset 86 and the maximum offset 86 of one of the opposing thrust reverser openings 50 is spaced 180 degrees apart from the other of the opposing thrust reverser openings 50.

In a further embodiment of any of the foregoing thrust reversers for a turbine engine, the maximum offset is between 1% and 10% greater than the first radius 66.

In a further embodiment of any of the foregoing thrust reversers for a turbine engine, the maximum offset is between 2% and 3% greater than the first radius 66.

In a further embodiment of any of the foregoing thrust reversers for a turbine engine, the forward side 58 is spaced a first axial distance 68 from the inlet 46 and an inner surface of the nozzle 38 tapers at a first angle 78 from the inlet 46 to the forward side 58 and tapers at a second angle 82 from the forward side 58 to the exit 48. The first angle 78 is less than the second angle 82.

In a further embodiment of any of the foregoing thrust reversers for a turbine engine, the thrust reverser doors 52 each include a forward edge 96 and an aft edge 98 and in a closed position the forward edge 96 includes an offset radius 64 equal to the offset radius 64 of the forward side 58 of a corresponding one of the thrust reverser openings 50 and the aft edge 98 of the thrust reverser doors 52 and an aft portion of the first and second arms 54, 56 define a portion of an inner periphery 108 at the exit 48.

A turbine engine assembly according to another exemplary embodiment of this disclosure, among other possible things includes a core engine 25, a nacelle 30 that surrounds at least a portion of the core engine 25 that defines a flow path between an intake end 42 and an exhaust end 44, and a nozzle 38 that is disposed at the exhaust end 44 of the nacelle 30. The nozzle 38 includes an inlet 46 and exit 48 spaced apart axially along a central axis, opposing thrust reverser openings 50, and thrust reverser doors 52 that are movable between a closed position that covers a corresponding one of the opposing thrust reverser openings 50 and an open position that uncovers the opposing thrust reverser openings 50. A cross-sectional area that is transverse to the central axis proximate a forward side 58 of each of the opposing thrust reverser openings 50 is oval shaped with an offset radius 64 within offset arc segments 104 that are aligned with the opposing thrust reverser openings 50 and a first radius 66 outside of the offset arc segment 104. The first radius 66 is less than the offset radius 64.

In a further embodiment of the foregoing thrust reverser for a turbine engine, the offset radius 64 includes a maximum offset and the maximum offset of one of the opposing thrust reverser openings 50 is spaced 180 degrees apart from the other of the opposing thrust reverser openings 50.

In a further embodiment of any of the foregoing thrust reversers for a turbine engine, the maximum offset is between 1% and 10% greater than the first radius 66.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An engine nacelle assembly comprising:
a nacelle defining a flow path between an intake end and an exhaust end; and
a nozzle disposed at the exhaust end of the nacelle about a central axis, the nozzle including an inlet spaced axially apart from an exit along the central axis, opposing thrust reverser openings and thrust reverser doors, wherein an inner peripheral surface of the nozzle within a plane transverse the central axis at each of the inlet and the exit is of a constant radius and a cross-sectional area transverse to the central axis proximate and forward of a forward side of each of the opposing thrust reverser openings is defined by the inner surface of the nozzle that includes a first radius and an offset radius that is offset from the first radius within opposing offset arc segments aligned with the opposing thrust reverser openings, wherein the first radius is disposed between the offset segments and the first radius is less than the offset radius.

2. The engine nacelle assembly as recited in claim 1, wherein the offset radius proximate the forward side of each of the opposing thrust reverser openings includes a maximum offset that is disposed within a common plane transverse to the central axis.

3. The engine nacelle assembly as recited in claim 2, wherein the maximum offset is between 2% and 3% greater than the first radius.

4. The engine nacelle assembly as recited in claim 1, wherein the cross-sectional area transverse to the central axis proximate the forward side is between 1% and 10% greater than a cross-sectional area at the same axial location with a uniform radius about the central axis.

5. The engine nacelle assembly as recited in claim 1, wherein the nozzle tapers at a first angle from the inlet to the forward side and tapers at a second angle from the forward side to the exit.

6. The engine nacelle assembly as recited in claim 5, wherein the first angle is less than the second angle.

7. The engine nacelle assembly as recited in claim 5, including first and second arms disposed between the opposing thrust reverser openings and extending from an axial location common with the forward side to the exit, wherein the first and second arms define a portion of the inner peripheral surface at the exit.

8. The engine nacelle assembly as recited in claim 7, wherein the inner peripheral surface at the exit is uninterrupted.

9. The engine nacelle assembly as recited in claim 7, wherein the thrust reverser doors each include a forward edge and an aft edge and in a closed position the forward edge includes an offset inner radius equal to the offset radius proximate the forward side of a corresponding one of the thrust reverser openings.

10. The engine nacelle assembly as recited in claim 9, wherein the aft edge of the thrust reverser doors defines a portion of the inner peripheral surface at the exit.

11. The engine nacelle assembly as recited in claim 9, wherein in a closed position, the thrust reverser doors define an arc of the inner surface of the nozzle that tapers from the forward side toward the exit.

12. A thrust reverser for a turbine engine comprising:
a nozzle including an inlet and exit spaced axially apart along a central axis, opposing thrust reverser openings and first and second side arms disposed on either side of each of the opposing thrust reverser openings, wherein an inner surface of the nozzle within a plane transverse to the central axis at each of the inlet and the exit is of a constant radius; and
thrust reverser doors movable between a closed position covering a corresponding one of the opposing thrust reverser openings and an open position uncovering the opposing thrust reverser openings, wherein a cross-sectional area transverse to the central axis proximate and forward of a forward side of each of the opposing thrust reverser openings is defined by the inner surface of the nozzle that includes a first radius and an offset radius that is offset from the first radius within opposing offset arc segments aligned with the opposing thrust reverser openings, wherein the first radius is disposed between the offset arc segments and is less than the offset radius.

13. The thrust reverser for a turbine engine as recited in claim 12, wherein the offset radius proximate the forward side of the opposing thrust reverser openings includes a maximum offset and the maximum offset of one of the opposing thrust reverser openings is spaced 180 degrees apart from the other of the opposing thrust reverser openings.

14. The thrust reverser for a turbine engine as recited in claim 13, wherein the maximum offset is between 1% and 10% greater than the first radius.

15. The thrust reverser for a turbine engine as recited in claim 13, wherein the maximum offset is between 2% and 3% greater than the first radius.

16. The thrust reverser for a turbine engine as recited in claim 12, wherein the forward side is spaced a first axial distance from the inlet and the inner surface of the nozzle tapers at a first angle from the inlet to the forward side and tapers at a second angle from the forward side to the exit, wherein the first angle is less than the second angle.

17. The thrust reverser for a turbine engine as recited in claim 16, wherein the thrust reverser doors each include a forward edge and an aft edge and in a closed position the forward edge includes an offset radius equal to the offset radius proximate the forward side of a corresponding one of the thrust reverser openings and the aft edge of the thrust reverser doors and an aft portion of the first and second arms define a portion of the inner surface at the exit.

18. A turbine engine assembly comprising: a core engine; a nacelle surrounding at least a portion of the core engine defining a flow path between an intake end and an exhaust end; and a nozzle disposed at the exhaust end of the nacelle, the nozzle including an inlet and exit spaced apart axially along a central axis, opposing thrust reverser openings, and thrust reverser doors movable between a closed position covering a corresponding one of the opposing thrust reverser openings and an open position uncovering the opposing thrust reverser openings, wherein an inner peripheral surface of the nozzle within a plane transverse to the central axis at each of the inlet and the exit is of a constant radius and a cross-sectional area transverse to the central axis proximate and forward of a forward side of each of the opposing thrust reverser openings is defined by the inner surface of the nozzle that includes a first radius and an offset radius that is offset from the first radius within opposing offset arc segments aligned with the opposing thrust reverser openings, wherein the first radius is disposed between the opposing offset arc segments and is less than the offset radius.

19. The thrust reverser for a turbine engine as recited in claim 18, wherein the offset radius includes a maximum offset and the maximum offset of one of the opposing thrust reverser openings is spaced 180 degrees apart from the other of the opposing thrust reverser openings.

20. The thrust reverser for a turbine engine as recited in claim 19, wherein the maximum offset is between 1% and 10% greater than the first radius.

* * * * *